United States Patent
Kasai et al.

(10) Patent No.: US 11,421,571 B2
(45) Date of Patent: Aug. 23, 2022

(54) ELECTRIC HEATING TYPE SUPPORT, EXHAUST GAS PURIFYING DEVICE, AND METHOD FOR PRODUCING ELECTRIC HEATING TYPE SUPPORT

(71) Applicant: NGK INSULATORS, LTD., Nagoya (JP)

(72) Inventors: Yoshiyuki Kasai, Kasugai (JP); Hironori Takahashi, Nagoya (JP); Yukiharu Morita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 56 days.

(21) Appl. No.: 16/893,600

(22) Filed: Jun. 5, 2020

(65) Prior Publication Data

US 2021/0062700 A1 Mar. 4, 2021

(30) Foreign Application Priority Data

Aug. 30, 2019 (JP) .............................. JP2019-158991

(51) Int. Cl.
| | |
|---|---|
| *F01N 3/20* | (2006.01) |
| *F01N 3/28* | (2006.01) |
| *B01J 35/04* | (2006.01) |
| *B01D 53/94* | (2006.01) |

(52) U.S. Cl.
CPC .......... *F01N 3/2013* (2013.01); *B01D 53/94* (2013.01); *B01J 35/04* (2013.01); *F01N 3/2803* (2013.01); *F01N 2330/02* (2013.01); *F01N 2330/06* (2013.01); *F01N 2330/30* (2013.01); *F01N 2350/02* (2013.01); *F01N 2450/22* (2013.01); *F01N 2510/02* (2013.01)

(58) Field of Classification Search
CPC .. F01N 3/2013; F01N 2450/22; F01N 3/2803; F01N 2330/30; F01N 2330/06
USPC ......................................................... 422/174
See application file for complete search history.

(56) References Cited

U.S. PATENT DOCUMENTS

| | | | |
|---|---|---|---|
| 2012/0187109 A1* | 7/2012 | Noguchi .................. | B01J 35/04 219/553 |
| 2013/0199165 A1* | 8/2013 | Kawase ................ | F01N 3/2828 60/300 |
| 2016/0271561 A1 | 9/2016 | Nakayama | |

FOREIGN PATENT DOCUMENTS

| | | |
|---|---|---|
| JP | 2013-136997 A1 | 7/2013 |
| JP | 2015-107452 A1 | 6/2015 |

* cited by examiner

*Primary Examiner* — Tom P Duong
(74) *Attorney, Agent, or Firm* — Burr & Brown, PLLC

(57) ABSTRACT

An electric heating type support includes: a pillar shaped honeycomb structure being configured to a ceramic, including: an outer peripheral wall; and partition walls disposed on an inner side of the outer peripheral wall, the partition walls defining a plurality of cells, each of the cells extending from one end face to other end face to form a flow path; at least one electrode layer disposed on a surface of the outer peripheral wall of the pillar shaped honeycomb structure; and at least one electrode connecting portion provided on the at least one electrode layer, the at least one electrode connecting portion being connectable to a metal connector. The at least one electrode connecting portion has at least one independent rising portion, and a height of the at least one electrode connecting portion from a surface of the at least one electrode layer is from 1 to 6 mm.

24 Claims, 10 Drawing Sheets

ELECTRIC HEATING TYPE SUPPORT, EXHAUST GAS PURIFYING DEVICE, AND METHOD FOR PRODUCING ELECTRIC HEATING TYPE SUPPORT

FIELD OF THE INVENTION

The present invention relates to an electric heating type support, an exhaust gas purifying device, and a method for producing an exhaust gas purifying device. More particularly, the present invention relates to an electric heating type support, an exhaust gas purifying device, and a method for producing an exhaust gas purifying device, which can be fitted by push-in canning and have good productivity.

BACKGROUND OF THE INVENTION

Recently, electric heating catalysts (EHCs) have been proposed to improve exhaust gas purification performance immediately after engine starting. The EHC is a system in which electrodes are arranged on a honeycomb structure made of conductive ceramics, and a current is conducted to heat the honeycomb structure itself, thereby increasing a temperature of a catalyst supported on the EHC to an activation temperature prior to the engine starting to achieve purification of an exhaust gas discharged immediately after the engine starting.

As described above, in the EHC, the electrodes are arranged in the honeycomb structure made of conductive ceramics and the current is conducted to heat the honeycomb structure itself. For the electrodes, various structures have been proposed depending on various purposes.

Patent Literature 1 discloses an electric heating type catalytic device intended to maintain spread of a current in an axial direction of a support even if cracks are generated in surface electrodes in a circumferential direction of the support. In the electric heating type catalytic device, as the electrodes arranged on the honeycomb structure, a plurality of wirings are provided up to an axial end of each surface electrode of the honeycomb structure. The plurality of wirings are fixed to the surface electrodes by a plurality of fixing layers, respectively.

However, the conventional electric heating type support has the following problems. As shown in FIG. 1, a conventional electric heating type support 50 has electrodes 52 each provided on an electrode layer arranged on a surface of a pillar shaped honeycomb structure 51. Further, in an exhaust gas purifying device or the like, the electric heating type support 50 is generally required for use after fitting it to a can body 53 through a mat (a holding material; not shown) for the purpose of protection from external impacts. In such fitting, it is convenient to push the electric heating type support 50 in the can body 53 to fit them, which is so-called push-in canning.

Here, as shown in FIG. 1, each electrode 52 of the electric heating type support 50 has to extend from an opening 54 of the can body 53 to the outside for connection to an external power source. Therefore, when the electric heating type support 50 is fitted to the can body 53, the electrode 52 will become an obstacle in the pushing canning as described above, leading to difficulty in fitting. Therefore, in the conventional electric heating type support 50, for example, the can body 53 is divided into two left and right bodies, and the divided can bodies 53 are fitted to the electric heating type support 50 such that each electrode 52 extends from the opening 54 of the can body 53 to the outside. Finally, the can bodies 53 divided into the two left and right bodies are welded to each other.

Thus, when fitted into the can body 53, the conventional electric heating type support 50 requires a step of previously dividing the can body 53 in order to allow the electrodes 52 to extend from the openings 54 of the can body 53 to the outside, and a step of welding the divided can bodies 53 after fitting the electric heating type carrier 50. Therefore, there is a problem in terms of productivity.

To address such a problem, Patent Literature 2 forms electrodes (wiring members) arranged on the pillar shaped honeycomb structure in the electric heating type support such that a drawing portion of each wiring member drawn out through the opening of the can body is in a bellows shape. It discloses that such a structure can allow the wiring member formed in the bellows shape to be drawn out to the outside after fitting the electric heating type support into the can body, so that the step of dividing the can body and the step of welding after the dividing will not be necessary, thereby improving productivity.

CITATION LIST

Patent Literatures

[Patent Literature 1] Japanese Patent Application Publication No. 2013-136997 A
[Patent Literature 2] Japanese Patent Application Publication No. 2015-107452 A

SUMMARY OF THE INVENTION

The present invention is specified as follows:
(1)
An electric heating type support, comprising:
a pillar shaped honeycomb structure being configured to a ceramic, comprising: an outer peripheral wall; and partition walls disposed on an inner side of the outer peripheral wall, the partition walls defining a plurality of cells, each of the cells extending from one end face to other end face to form a flow path;
at least one electrode layer disposed on a surface of the outer peripheral wall of the pillar shaped honeycomb structure; and
at least one electrode connecting portion provided on the at least one electrode layer, the at least one electrode connecting portion being connectable to a metal connector,
wherein the at least one electrode connecting portion has at least one independent rising portion, and a height of the at least one electrode connecting portion from a surface of the at least one electrode layer is from 1 to 6 mm.
(2)
An electric heating type support fittable to a can body, the electric heating type support comprising:
a pillar shaped honeycomb structure being configured to a ceramic, comprising: an outer peripheral wall; and partition walls disposed on an inner side of the outer peripheral wall, the partition walls defining a plurality of cells, each of the cells extending from one end face to other end face to form a flow path;
at least one electrode layer disposed on a surface of the outer peripheral wall of the pillar shaped honeycomb structure; and
at least one electrode connecting portion provided on the at least one electrode layer, the at least one electrode connecting portion being connectable to a metal connector, wherein the electrode connecting portion has at least one independent rising portion, and a height of the electrode connecting portion from a surface of the at least one electrode layer is less than or equal to a height of a gap between the can body and the electrode layer, the gap being generated when the electric heating type support is fitted to the can body.

(3)

An exhaust gas purifying device, comprising:
the electric heating type support according to (1) or (2);
a can body that is fitted to an outer peripheral surface of the electric heating type support; and
a metal connector electrically connected to the electrode connecting portion.

(4)

A method for producing the exhaust gas purifying device according to (3), the method comprising the following steps, in order:
fitting the electric heating type support to the can body; and
electrically connecting the metal connector to the electrode connecting portion.

DETAILED DESCRIPTION OF THE INVENTION

In the Patent Literature 2, the electric heating type support can be fitted by the push-in canning as described above. On the other hand, each electrode (wiring member) has to be formed in the bellows shape, leading to a complicated electrode shape. Therefore, there is a problem of productivity in terms of formation of the electrodes, and there is room for improvement.

The present invention has been made in view of the above problems. An object of the present invention is to provide an electric heating type support and an exhaust gas purifying device, which can be fitted by push-in canning and have good productivity.

As a result of intensive studies, the present inventors have found that the above problems can be solved by providing electrode connecting portions connectable to metal connectors on electrode layers arranged on a surface of an outer peripheral wall of a honeycomb structure, and having at least one independent rising portion at each electrode connecting portion, and forming each electrode connecting portion such that a height of each electrode connecting portion from the surface of each electrode layer is from 1 to 6 mm.

According to the present invention, it is possible to provide an electric heating type support and an exhaust gas purifying device, which can be fitted by push-in canning and have good productivity.

Embodiments of an electric heating type support and an exhaust gas purifying device according to the present invention will be described below with reference to the drawings. However, it is to understand that the present invention is not construed as being limited thereto, and various changes, modifications, and improvements may be made based on knowledge of those skilled in the art without departing from the scope of the present invention.

<Electric Heating Type Support>

Figure 1:
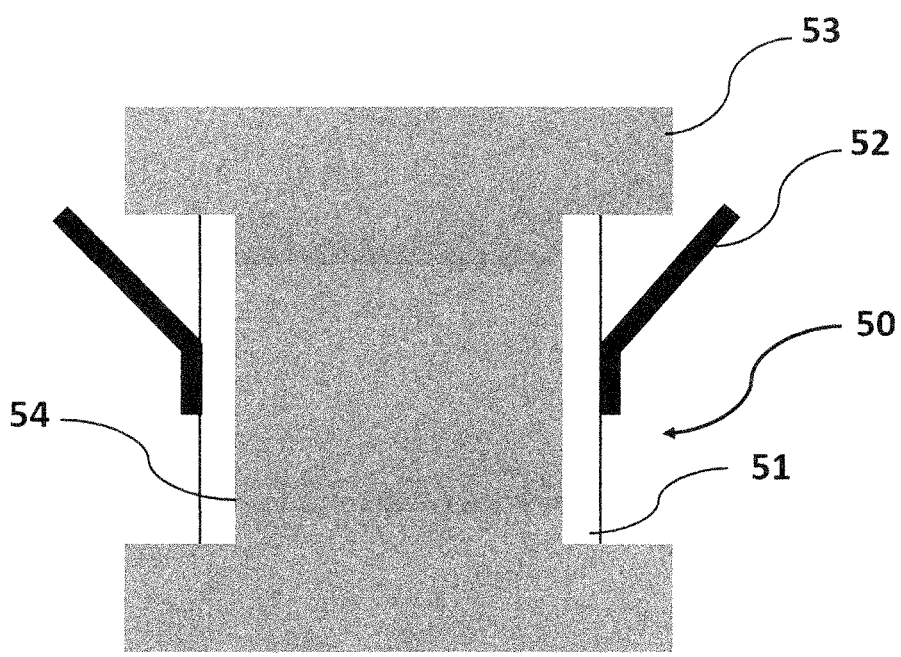
FIG. 1 is a schematic plan view showing a state where a conventional electric heating type support and a can body have been fitted together.
Figure 2:
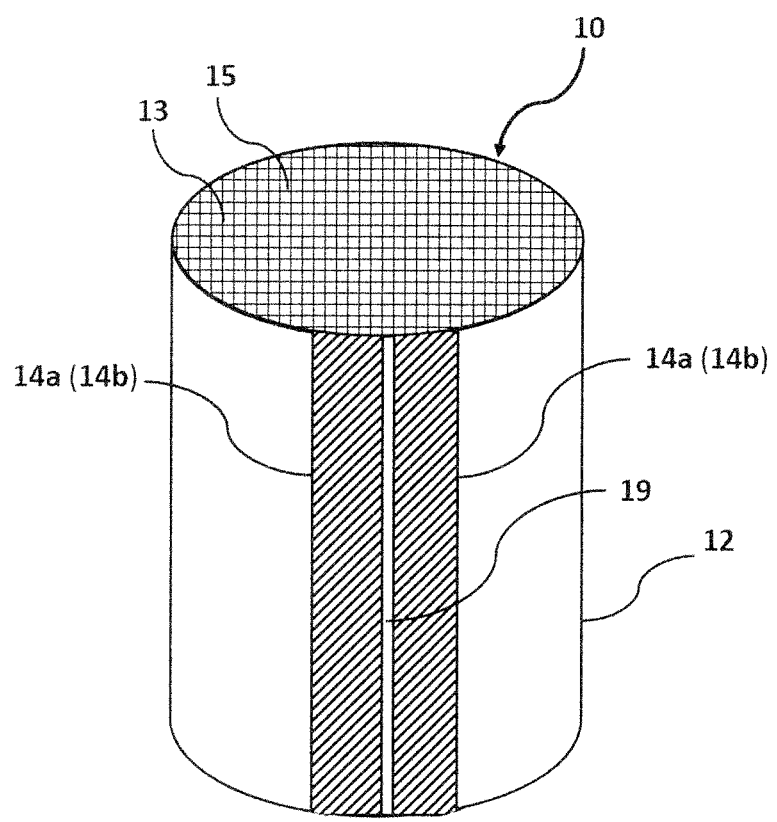
FIG. 2 is an external schematic view of a pillar shaped honeycomb structure of an electric heating type support according to an embodiment of the present invention.
Figure 3:
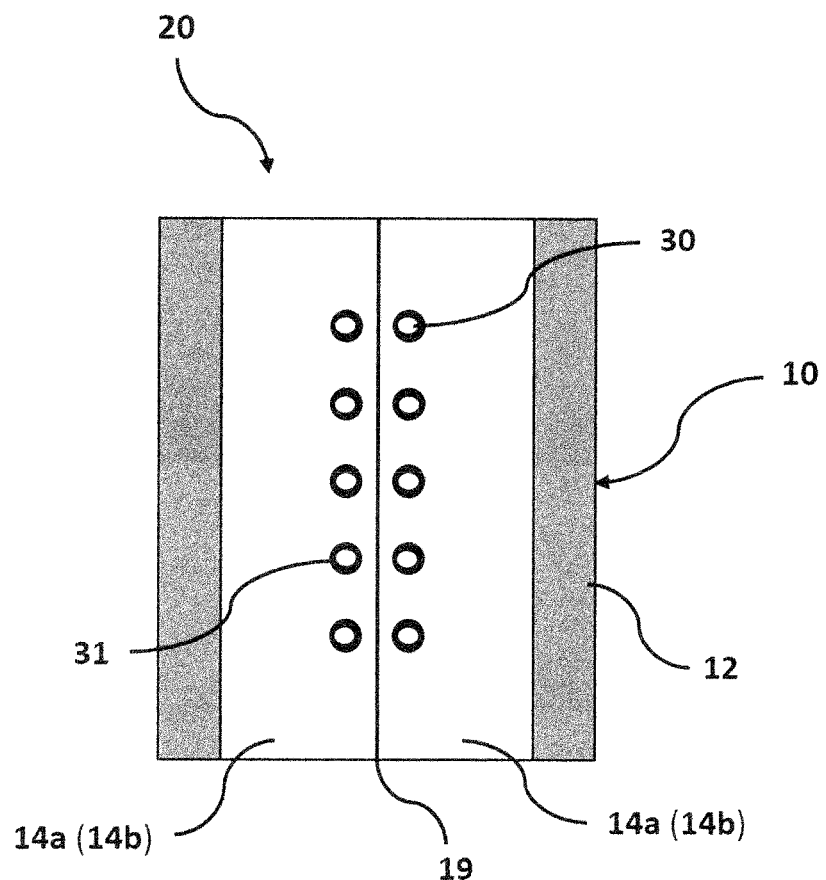
FIG. 3 is a plan view of an electric heating type support when directly facing one of electrode layers according to an embodiment of the present invention.
Figure 4:
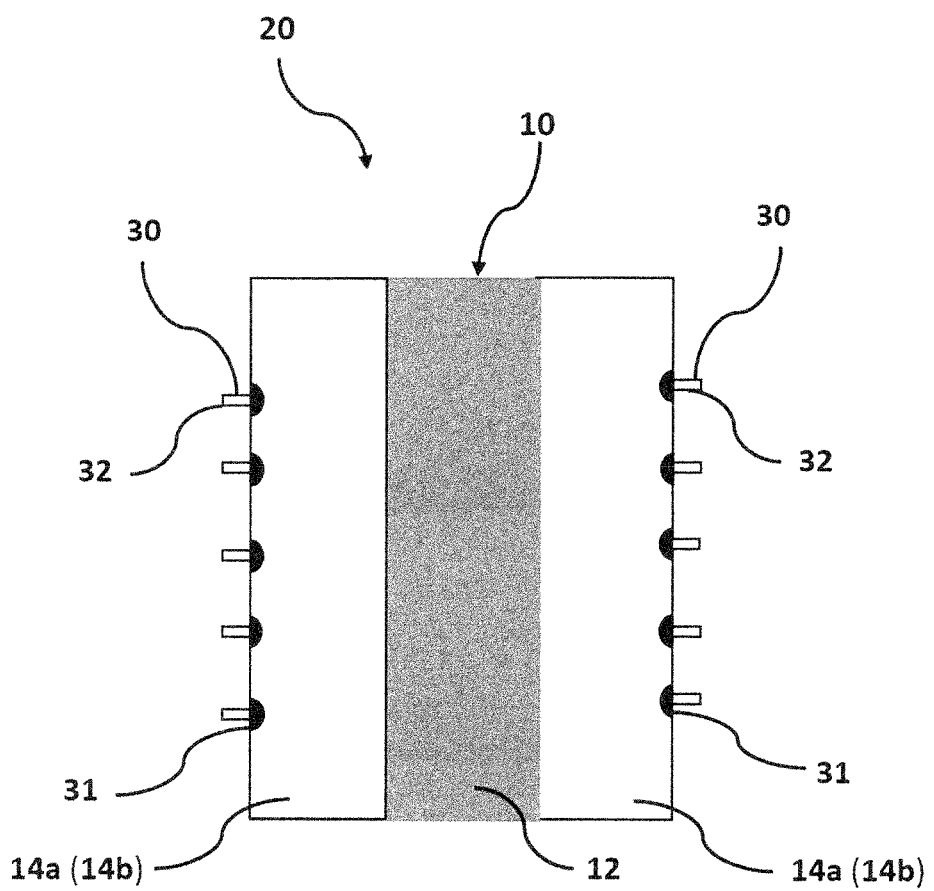
FIG. 4 is a plan view of the electric heating type support in FIG. 3 as viewed from the side.

FIG. 2 is a schematic external view of a pillar shaped honeycomb structure 10 of an electric heating type support 20 according to an embodiment of the present invention. FIG. 3 is a plan view of the electric heating type support 20 when directly facing one of electrode layers 14a, 14b according to an embodiment of the present invention. FIG. 4 is a plan view of the electric heating type support 20 in FIG. 3 as viewed from the side.

(1. Pillar Shaped Honeycomb Structure)

The pillar shaped honeycomb structure 10 includes: an outer peripheral wall 12; and partition walls 13 which are disposed on an inner side of the outer peripheral wall 12 and define a plurality of cells 15 extending from one end face to the other end face to form flow paths.

An outer shape of the pillar shaped honeycomb structure 10 is not particularly limited as long as it is pillar shaped. For example, the honeycomb structure can have a shape such as a pillar shape with circular end faces (circular pillar shape), a pillar shape with oval end faces and a pillar shape with polygonal (square, pentagonal, hexagonal, heptagonal, octagonal, etc.) end faces. The pillar shaped honeycomb structure 10 preferably has a size of the end face of from 2000 to 20000 mm$^2$, and more preferably from 5000 to 15000 mm$^2$, for the purpose of improving heat resistance (suppressing cracks entering the outer peripheral wall in a circumferential direction).

The pillar shaped honeycomb structure 10 has electrical conductivity. The electrical resistivity is not particularly limited as long as the pillar shaped honeycomb structure 10 can generate heat by Joule heat upon electrical conduction. The electrical resistivity is preferably from 0.01 to 200 Ωcm, and more preferably from 10 to 100 Ωcm. In the present invention, the electrical resistivity of the pillar shaped honeycomb structure 10 is a value measured at 400° C. by a four-terminal method.

A material of the pillar shaped honeycomb structure 10 can be selected from, but not limited to, conductive ceramics such as silicon carbide, silicon, and zirconia. Further, a silicon carbide-metallic silicon composite material, a silicon carbide/graphite composite material, or the like can also be used. Among them, from the viewpoint of compatibility of heat resistance and conductivity, the material of the pillar shaped honeycomb structure 10 is preferably a ceramic mainly based on a silicon-silicon carbide composite material or silicon carbide, and more preferably a ceramic mainly based on a silicon-silicon carbide composite material. The phrase "the material of the pillar shaped honeycomb structure 10 is a ceramic mainly based on a silicon-silicon carbide composite" means that the pillar shaped honeycomb structure 10 contains 90% by mass or more of the silicon-silicon carbide composite material (total mass) based on the entire honeycomb structure. Here, for the silicon-silicon carbide composite material, it contains silicon carbide particles as aggregates and silicon as a bonding material for bonding the silicon carbide particles, and a plurality of silicon carbide particles are preferably bonded by silicon so as to form pores between the silicon carbide particles. The phrase "the material of the pillar shaped honeycomb structure 10 is a ceramic mainly based on silicon carbide" means that the pillar shaped honeycomb structure 10 contains 90% by mass or more of silicon carbide (total mass) based on the entire honeycomb structure.

When the pillar shaped honeycomb structure 10 contains the silicon-silicon carbide composite material, a ratio of a "mass of silicon as a bonding material" contained in the pillar shaped honeycomb structure 10 to the total of a "mass of silicon carbide particles as aggregates" contained in the pillar shaped honeycomb structure 10 and a "mass of silicon as a bonding material" contained in the pillar shaped honeycomb structure 10 is preferably from 10 to 40% by mass, and more preferably from 15 to 35% by mass. When it is 10% by mass or more, the strength of the pillar shaped honeycomb structure 10 is sufficiently maintained. When it is 40% by mass or less, the shape is easily maintained during firing.

A shape of each cell in a cross section perpendicular to an extending direction of the cells 15 is not limited, but it is preferably a quadrangle, a hexagon, an octagon, or a combination thereof. Among these, the quadrangle and the hexagon are preferred. Such a cell shape can lead to a decreased pressure loss upon flowing of an exhaust gas through the pillar shaped honeycomb structure 10, resulting in improvement of purification performance of the catalyst.

Each of the partition walls 13 defining the cells 15 preferably has a thickness of from 0.07 to 0.3 mm, and more preferably from 0.1 to 0.25 mm. The thickness of each partition wall 13 of 0.07 mm or more can suppress a decrease in the strength of the pillar shaped honeycomb structure 10. The thickness of each partition wall 13 of 0.3 mm or less can suppress an increase in pressure loss upon flowing of an exhaust gas, when the pillar shaped honeycomb structure 10 is used as a catalyst support and a catalyst is supported thereon. In the present invention, the thickness of the partition wall 13 is defined as a length of a portion passing through the partition wall 13, among line segments connecting centers of gravity of the adjacent cells 15 in a cross section perpendicular to the extending direction of the cells 15.

The pillar shaped honeycomb structure 10 preferably has a cell density of from 40 to 150 cells/cm$^2$, and more preferably from 70 to 100 cells/cm$^2$, in a cross section perpendicular to a flow path direction of cells 15. The cell density in such a range can increase the purification performance of the catalyst while reducing the pressure loss upon flowing of an exhaust gas. The cell density of 40 cells/cm$^2$ or more ensures a sufficient catalyst supporting area. The cell density of 150 cells/cm$^2$ or less can prevent a pressure loss upon flowing of an exhaust gas from being excessively increased when the pillar shaped honeycomb structure 10 is used as a catalyst support and a catalyst is supported thereon. The cell density is a value obtained by dividing the number of cells by an area of one end face of the pillar shaped honeycomb structure 10 excluding the outer peripheral wall 12.

The provision of the outer peripheral wall 12 of the pillar shaped honeycomb structure 10 is useful in terms of ensuring the structural strength of the pillar shaped honeycomb structure 10 and preventing a fluid flowing through the cells 15 from leaking from the outer peripheral wall 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall and the partition wall 13 is lost to reduce thermal shock resistance. Therefore, the thickness of the outer peripheral wall 12 is preferably 1.0 mm or less, and more preferably 0.8 mm or less, and still more preferably 0.6 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in a cross section perpendicular to a cell extending direction. Further, the thickness of the outer peripheral wall in the region where the electrode connecting portions are arranged may be partially reduced.

The partition walls 13 can be porous. A porosity of the partition wall 13 is preferably from 35 to 60%, and more preferably from 35 to 45%. The porosity of 35% or more can lead to more easy suppression of deformation during firing. The porosity of 60% or less can allow the strength of the pillar shaped honeycomb structure to be sufficiently maintained. The porosity is a value measured by a mercury porosimeter.

The partition walls 13 of the pillar shaped honeycomb structure 10 preferably have an average pore diameter of from 2 to 15 μm, and more preferably from 4 to 8 μm. The average pore diameter of 2 μm or more can prevent excessively high electric resistivity. The average pore diameter of 15 μm or less can prevent excessively low electric resistivity. The average pore diameter is a value measured by a mercury porosimeter.

(2. Electrode Layer)

The pillar shaped honeycomb structure 10 has electrode layers 14a, 14b provided on the surface of the outer peripheral wall 12. The electrode layers 14a, 14b may be a pair of electrode layers provided such that one electrode layer faces the other electrode layer across a central axis of the pillar shaped honeycomb structure 10. The electrode layers may not be provided as a pair, as described above, and for example, only one electrode layer as described above (only one of the electrode layer 14a and the electrode layer 14b) may be provided on the surface of the outer peripheral wall 12 of the pillar shaped honeycomb structure 10.

The electrode layers 14a, 14b may be formed in a non-limiting region. In terms of enhancing uniform heat generation of the pillar shaped honeycomb structure 10, each of the electrode layers 14a, 14b is preferably provided so as to extend in a form of belt on the surface of the outer peripheral wall 12 in the circumferential direction and the cell extending direction in the surface of the outer peripheral wall 12. More particularly, It is desirable that each of the electrode layers 14a, 14b extends over a length of 80% or more, and preferably 90% or more, and more preferably the full length, between both end faces of the pillar shaped honeycomb structure 10, from the viewpoint that a current easily spreads in an axial direction of each of the electrode layers 14a, 14b.

In an embodiment according to the present invention, each of the electrode layers 14a, 14b may be provided with a slit-shaped separation zone 19 extending along the axial direction of the pillar shaped honeycomb structure 10 as shown in FIG. 2. The separation zone 19 has functions of alleviating a thermal expansion difference between the pillar shaped honeycomb structure 10 and the electrode layers 14a, 14b upon heating of the electric heating type support 20, and of suppressing cracking and/or peeling of the electrode layers 14a, 14b due to the thermal expansion difference. The slit-shaped separation zone 19 can be formed into a width of, for example, 0.5 to 3 mm, although not particularly limited thereto. The separation zone 19 in each of the electrode layers 14a, 14b may not be formed, and each of the electrode layers 14a, 14b may be one continuous electrode layer.

Each of the electrode layers 14a, 14b preferably has a thickness of from 0.01 to 5 mm, and more preferably from 0.01 to 3 mm. Such a range can allow uniform heat generation to be enhanced. The thickness of each of the electrode layers 14a, 14b of 0.01 mm or more can lead to appropriate control of electric resistance, resulting in more uniform heat generation. The thickness of each of the electrode layers 14a, 14b of 5 mm or less can reduce a risk of breakage during canning. The thickness of each of the electrode layers 14a, 14b is defined as a thickness in a direction of a normal line to a tangential line at a measurement point on an outer surface of each of the electrode layers 14a, 14b when observing the point of each electrode layer to be subjected to thickness measurement in a cross section perpendicular to the cell extending direction.

The electric resistivity of each of the electrode layers 14a, 14b is lower than the electric resistivity of the pillar shaped honeycomb structure 10, whereby the electricity tends to flow preferentially to the electrode layers 14a, 14b, and the electricity tends to spread in the cell flow path direction and the circumferential direction during electric conduction. The electric resistivity of the electrode layers 14a, 14b is preferably 1/10 or less, and more preferably 1/20 or less, and even more preferably 1/30 or less, of the electric resistivity of the pillar shaped honeycomb structure 10. However, if the difference in electric resistivity between both becomes too large, the current is concentrated between ends of the opposing electrode layers 14a, 14b to bias the heat generated in the pillar shaped honeycomb structure 10. Therefore, the electric resistivity of the electrode layers 14a, 14b is preferably 1/200 or more, and more preferably 1/150 or more, and even more preferably 1/100 or more, of the electric resistivity of the pillar shaped honeycomb structure 10. In the present invention, the electric resistivity of the electrode layers 14a, 14b is a value measured at 400° C. by a four-terminal method.

In order to facilitate spreading of electricity in the flow path direction and in the circumferential direction of the cells upon conduction of current, it is also preferable to partially increase the thickness of each of the electrode layers 14a, 14b or partially decrease the electrical resistivity.

Each of the electrode layers 14a, 14b may be made of a composite material of a metal and conductive ceramics (cermet). Examples of the metal include a single metal of Cr, Fe, Co, Ni, Si or Ti, or an alloy containing at least one metal selected from the group consisting of those metals. Non-limiting examples of the conductive ceramics include silicon carbide (SiC), and metal compounds such as metal silicide such as tantalum silicide ($TaSi_2$) and chromium silicide ($CrSi_2$). Specific examples of the composite material of the metal and the conductive ceramics (cermet) include a composite material of metallic silicon and silicon carbide, a composite material of metal silicide such as tantalum silicide and chromium silicide, metallic silicon and silicon carbide, and further a composite material containing, in addition to one or more metals listed above, one or more ceramics such as alumina, mullite, zirconia, cordierite, silicon nitride, and aluminum nitride, in terms of decreased thermal expansion. Among the various metals and conductive ceramics as described above, a preferable material of the electrode layers 14a, 14b is a combination of a metal silicide such as tantalum silicide and chromium silicide with a composite material of metallic silicon and silicon carbide, because it can be fired simultaneously with the pillar shaped honeycomb structure, which contributes to simplification of the producing steps.

(3. Electrode Connecting Portion)

Electrode connecting portions 30 are provided on the electrode layers 14a, 14b and are electrically connected thereto. The electrode connecting portions 30 are formed so as to be connectable to metal connectors 41 as described later, and each metal connector 41 is electrically connected to an external power supply. Accordingly, when a voltage is applied to the electrode connecting portions 30, a current can be conducted to allow the pillar shaped honeycomb structure 10 to generate heat by Joule heat. Therefore, the pillar shaped honeycomb structure 10 can be preferably used as a heater. The applied voltage is preferably from 12 to 900 V, and more preferably 48 to 600 V. However, the applied voltage may be changed as needed.

Each electrode connecting portion 30 is configured to have at least one independent rising portion 32. The rising portion 32 means a portion that stands upright in a substantially vertical direction from a curved surface of the outer peripheral wall of the honeycomb structure. As shown in FIGS. 3 and 4, each of the electrode connecting portions 30 of the electric heating type support 20 according to an embodiment of the present invention is formed in a circular pillar shape, i.e., a cylindrical pin shape. In this case, the rising portion 32 of each electrode connecting portion 30 represents the electrode connecting portion 30 itself formed in the circular pillar shape. In each electrode connecting portion 30 formed in the circular pillar shape, an outer diameter of the circular pillar is preferably from 1 to 20 mm. The outer diameter of the circular pillar of each electrode connecting portion 30 of 1 mm or more can allow the electric heating type support 20 to be efficiently heated with a decreased number of electrode connecting portions 30. The outer diameter of the circular pillar of each electrode connecting portion 30 of 20 mm or less can allow the number of electrode connecting portions 30 to be increased, thereby more uniformly heating the electric heating type support 20. Further, it can lead to increased arrangement flexibility of the electrode connecting portions 30. Furthermore, it has an advantage that since each electrode connecting portion 30 is smaller, the thermal stress generated by heating the electric heating type support 20 is lower and is difficult to be damaged. In the electrode connecting portion 30 formed in the circular pillar shape, the outer diameter of the circular pillar may more preferably be from 1 to 10 mm, and even more preferably from 1 to 5 mm. The shape of each electrode connecting portion 30 is not limited to the circular pillar shape, and it may be formed in the other pillar shape, for example, a polygonal pillar shape.

In the electrode connecting portions 30 as shown in FIGS. 3 and 4, the slit-shaped separation zone 19 is formed on each of the electrode layers 14a, 14b. Therefore, the electrode connecting portions 30 are arrayed at equal intervals such that five circular pillar shaped electrode connecting portions 30 respectively stand upright on both of the electrode layers 14a, 14b divided by the separation zone 19. The number of the electrode connecting portions 30 is not particularly limited, and it can be appropriately adjusted depending on the relationship between the size of each electrode connecting portion 30 and the size of each electrode layer 14a, 14b.

When each electrode connecting portion 30 is the pillar shaped electrode connecting portion thus provided so as to stand upright on each of the electrode layers 14a, 14b, there are advantages that the shape of each electrode connecting portion 30 is simplified without complicating the structure, and the electrode connecting portions 30 are easily disposed on the electrode layers 14a, 14b.

Figure 5:
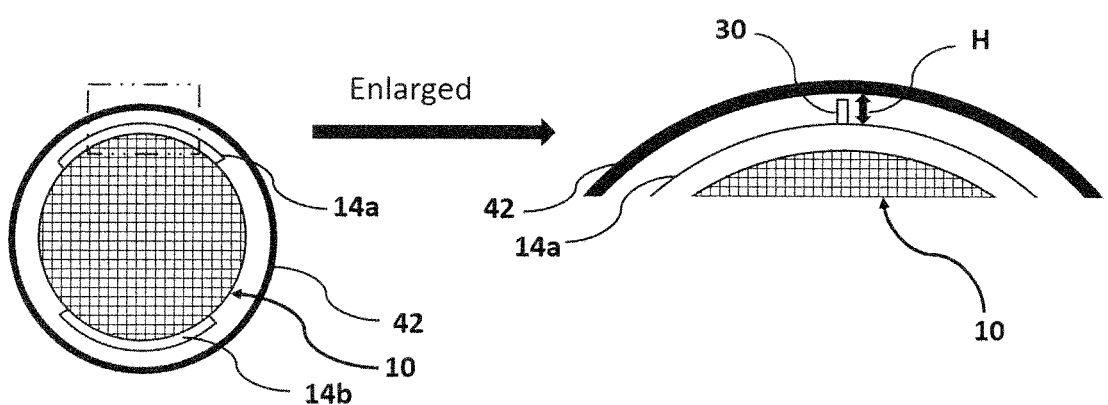
FIG. 5 is schematic cross-sectional views of a pillar shaped honeycomb structure of an electric heating type support and a can body fitted with the electric heating type support, which is perpendicular to an axial direction, according to an embodiment of the present invention.

FIG. 5 shows a schematic cross-sectional view of the pillar shaped honeycomb structure 10 of the electric heating type support 20 and a can body 42 fitted to the electric heating type support 20, which is perpendicular to the axial direction, according to an embodiment of the present invention. The right view is an enlarged view of a part of the left view in FIG. 5. As shown in the right view of FIG. 5, when the electric heating type support 20 is fitted to the can body 42, a gap is created between the can body 42 and the electrode layer 14a, 14b. In the right view of FIG. 5, the height of the gap is represented by H. The gap may be provided with a mat (a holding material) to hold the electric heating type support 20 in the can body 42 so as to prevent the former from moving. The holding material is preferably a flexible heat insulating member.

In the electric heating type support 20 according to an embodiment of the present invention, the height of each electrode connecting portion 30 from each surface of the electrode layers 14a, 14b is controlled to 1 to 6 mm. When the height of each electrode connecting portion 30 from each surface of the electrode layers 14a, 14b is 1 mm or more, the electrode connector 14 can be satisfactorily connected to the metal connector 41.

The mat is typically provided in the gap between the can body 42 and each of electrode layers 14a, 14b, and the thickness of the mat is about 1 to 6 mm. Therefore, the height of each electrode connecting portion 30 from each surface of the electrode layers 14a, 14b of from 1 to 6 mm can avoid contact of each electrode connecting portion 30 with the can body 42 when fitting the electric heating support 20 to the can body 42. As a result, the electric heating type support 20 can be fitted to the can body 42 by a simple means such as so-called push-in canning which achieves fitting by forcing the electric heating type support 20 into the can body 42, thereby improving the productivity. Further, the height of each electrode connecting portion 30 from each surface of the electrode layers 14a, 14b can be equal to or less than the height H of the gap between the can body 42 and each of the electrode layers 14a and 14b, thereby avoiding the contact of the electrode connecting portions 30 with the can body 42 when fitting the electric heating type support 20 to the can body 42.

When the height of each electrode connecting portion 30 from each surface of the electrode layers 14a, 14b is controlled to 1 to 6 mm, the pillar shaped honeycomb structure 10 should be fixed in a step of coating the catalyst in the cells 15 of the pillar shaped honeycomb structure 10 of the electric heating type support 20, but at this time, the electrode connecting portions 30 do not obstruct the fixing, leading to easy coating process of the catalyst in the cells 15 of the pillar shaped honeycomb structure 10. Further, the coating process of the catalyst may carry out a step of a treatment with an acidic solution and a step of heating in a heating furnace. However, since each electrode connecting portion 30 has no complicated shape, it is possible to prevent the electrodes from being deteriorated due to the influence of the acid or heat. Further, since each electrode connecting portion 30 has no complicated shape, there is also an advantage of having higher arrangement flexibility on the surfaces of the electrode layers 14a, 14b. The height of each electrode connecting portion 30 from each surface of the electrode layers 14a, 14b is preferably from 2 to 5 mm, and more preferably from 3 to 5 mm.

Materials of the electrode connecting portions 30 are not particularly limited as long as the electrode connecting portions 30 are electrically connected to the metal connectors 41, and as a voltage is applied to the electrode connecting portions 30, a current is conducted to heat the pillar shaped honeycomb structure 10 by Joule heat through the electrode layers 14a, 14b. At least the surfaces of the electrode connecting portions 30 may be made of a metal. An example of such a structure includes an electrode in which a metal plate having a thickness of about 1 mm is attached to a surface of a cylindrical electrode rod made of a ceramic and having an outer diameter of about 2 to 3 mm. Further, the electrode connecting portions 30 may be entirely made of a metal.

As the metal used for the electrode connecting portions 30, simple metals and alloys may be employed. However, from the viewpoint of corrosion resistance, electrical resistivity and linear expansion coefficient, for example, the metal can preferably be an alloy containing at least one selected from the group consisting of Cr, Fe, Co, Ni, Ti, Al, Si and Mo, and more preferably stainless (Fe—Cr, Fe—Ni—Cr) steel, Fe—Ni alloy, Ni—Cr alloy, Ni—Mo alloy, or Ni—Cr—Mo alloy.

It is desirable that the electrode connecting portions 30 are fixed to the surfaces of the electrode layers 14a, 14b by bonding, so that the electrode connecting portions 30 are electrically connected to the electrode layers 14a, 14b via welded portions 31.

Figure 10:
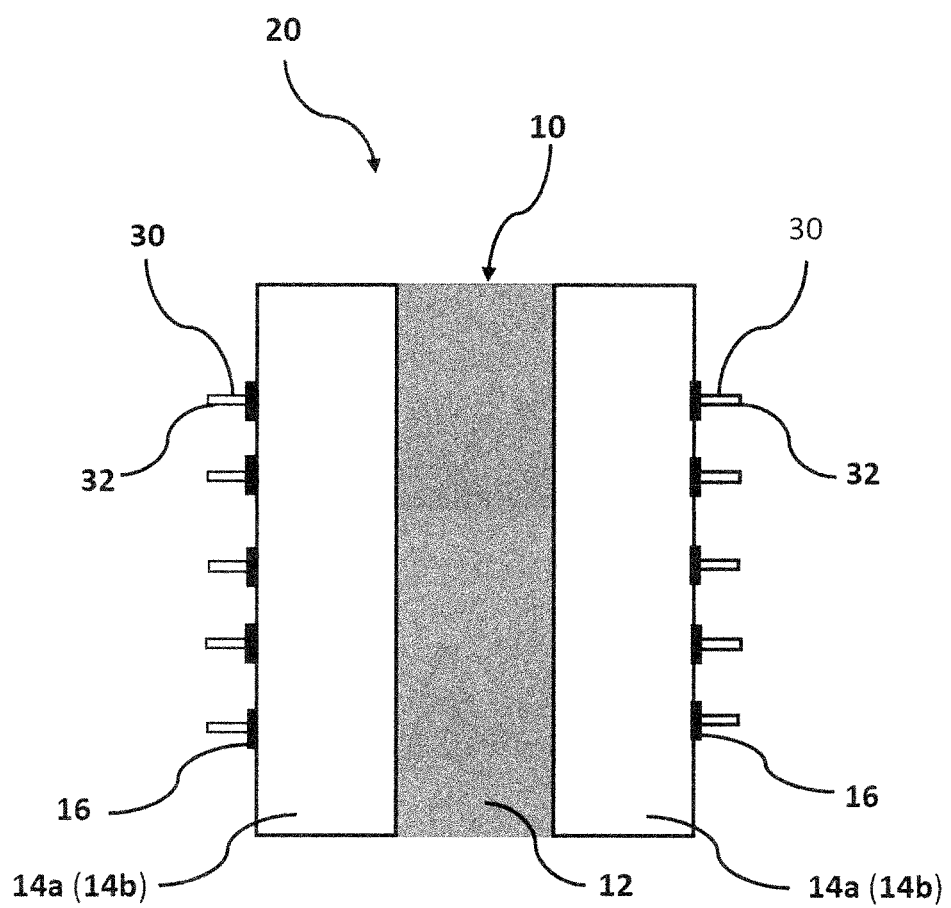
FIG. 10 is a plan view of another embodiment of the electric heating type support in FIG. 4.

As shown in FIG. 10, it is also preferable that each electrode connecting portion 30 is fixed onto each electrode layer 14a, 14b on which at least one intermediate layer 16 is provided. The provision of the intermediate layer 16 can lead to a decreased difference between thermal expansion coefficients of the electrode connecting portion 30 and each of the electrode layers 14a, 14b, for example. Further, since the thermal stress generated when the electrode connecting portions 30 are bonded to the surfaces of the electrode layers 14a, 14b is decreased, the electrical connection can be facilitated.

When the intermediate layer is formed, its thickness is preferably in a range of from 3 to 400 µm. The thickness of the intermediate layer of 3 µm or more can allow its effect to be more remarkably obtained. On the other hand, the thickness of the intermediate layer of 400 µm or less can suppress the influence on the current flowing through the pillar shaped honeycomb structure 10 and minimize the influence on an original function of a support for an electric heating type catalyst. In view of the foregoing, the thickness of the intermediate layer is more preferably from 5 to 100 μm.

The intermediate layer 16 may preferably be made of an oxide ceramic or a mixture of a metal or a metal compound and an oxide ceramic.

The metal may be either a simple metal or an alloy, including, for example, silicon, aluminum, iron, stainless steel, titanium, tungsten, Ni alloys, Ni—Cr alloys, Ni—Co alloys, and the like. Examples of the metal compound include substances other than the oxide ceramics, such as metal oxides, metal nitrides, metal carbides, metal silicides, metal borides, and complex oxides. For example, $FeSi_2$, $CrSi_2$, and the like may be suitably used. Both the metal and the metal compound may be used alone or in combination of two or more.

Specific examples of the oxide ceramics include glass, cordierite, and mullite. The glass may further contain an oxide composed of at least one component selected from the group consisting of B, Mg, Al, Si, P, Ti and Zr. The further containing of at least one selected from the above group is more preferable in terms of further improved strength of the electrode layers.

The thermal expansion coefficient of the intermediate layer 16 can be selected as needed by using the above materials, but the thermal expansion coefficient is preferably a value between the thermal expansion coefficient of the electrode layer 14 and the thermal expansion coefficient of the electrode connecting portion 30. Further, the intermediate layer does not necessarily have to be a single layer, and the intermediate layer may be multilayer.

Figure 6:
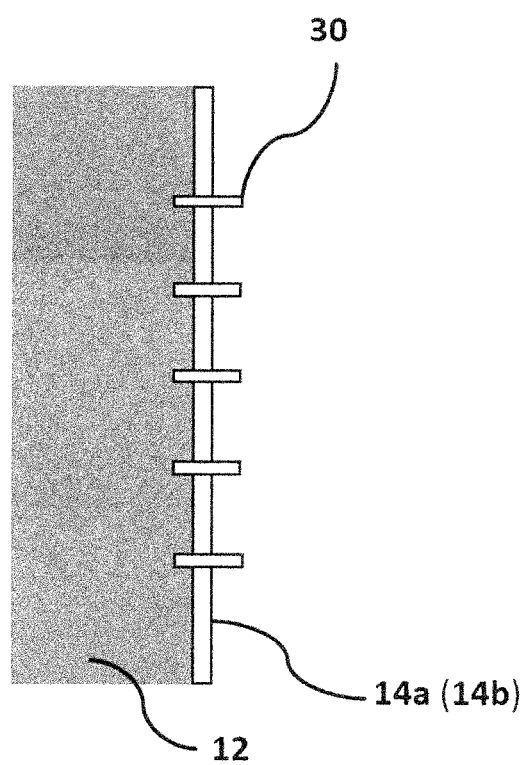
FIG. 6 is a schematic cross-sectional view of an outer peripheral wall of a pillar shaped honeycomb structure, electrode connecting portions, and an electrode layer, which is parallel to an axial direction of the pillar-shaped honeycomb structure, according to another embodiment of the present invention.

FIG. 6 is a schematic cross-sectional view of the outer peripheral wall 12, the electrode connecting portions 30, and the electrode layer 14a, 14b of the pillar shaped honeycomb structure 10, which is parallel to the axial direction of the pillar shaped honeycomb structure 10 according to another embodiment of the present invention. As shown in FIG. 6, a lower end of each electrode connecting portion 30 may be embedded in the outer peripheral wall 12 of the pillar shaped honeycomb structure 10. Further, each electrode connecting portion may be provided with a positioning portion in order to determine a position where each electrode connecting portion is embedded in the outer peripheral wall. According to such a structure, the electrode connecting portions 30 are more firmly supported in the electric heating type support 20. It is preferable that 30 to 70% of the entire height of each electrode connecting portion 30 is embedded, and that the lower end of the electrode connecting portion 30 is embedded in the outer peripheral wall 12 of the pillar shaped honeycomb structure 10.

Figure 7:
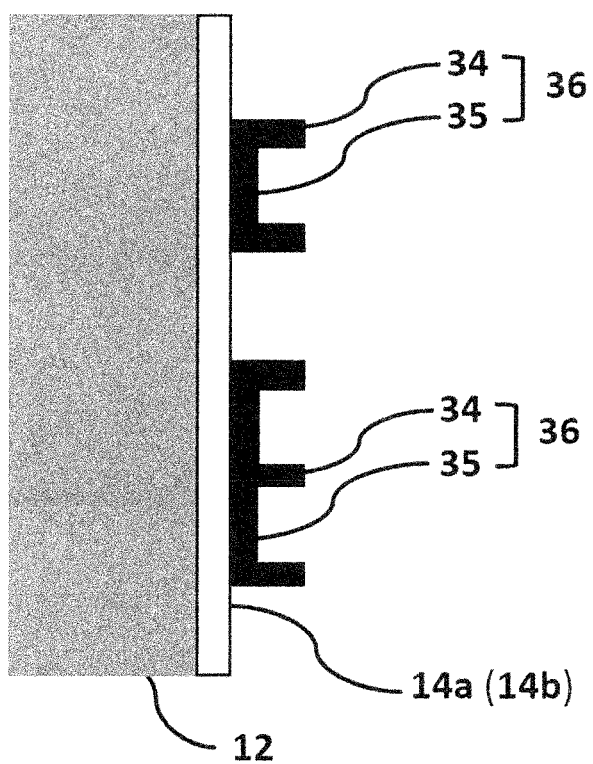
FIG. 7 is a schematic cross-sectional view of an outer peripheral wall of a pillar shaped honeycomb structure, electrode connecting portions, and an electrode layer, which is parallel to an axial direction of the pillar shaped honeycomb structure, according to still another embodiment of the present invention.

FIG. 7 is a schematic cross-sectional view of the outer peripheral wall 12, the electrode connecting portions 36, and the electrode layer 14a, 14b of the pillar shaped honeycomb structure 10, which is parallel to the axial direction of the pillar shaped honeycomb structure 10, according to yet another embodiment of the present invention. Each electrode connecting portion 36 has a plurality of pillar shaped parts 34 (rising parts) provided so as to stand upright on each of the electrode layers 14a, 14b, and a connecting part 35 that connects the lower ends of the pillar shaped parts 34. According to such a structure, a larger number of pillar shaped parts 34 can be disposed with a smaller number of electrode connecting portions 36, so that design flexibility can be increased while ensuring good connectivity to the metal connector 41.

The pillar shaped part 34 can be formed in a circular pillar shape or a polygonal pillar shape. The connecting part 35 that connects the lower ends of the plurality of pillar shaped parts 34 may be integrally formed with the plurality of pillar shaped parts 34, or the separately formed portions may be connected by welding or the like. Further, the electrode connecting portions 36 as shown in FIG. 7 and the electrode connecting portions 30 as shown in FIGS. 3, 4, and 6 may be provided on the surfaces of the electrode layers 14a, 14b.

Figure 8:
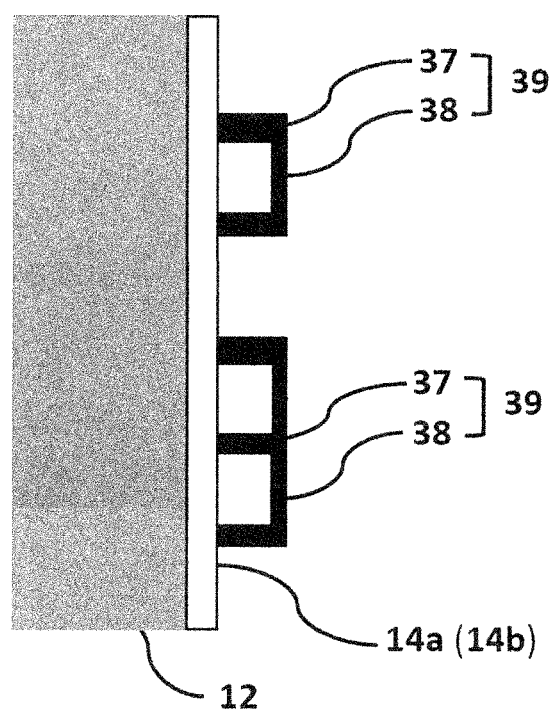
FIG. 8 is a schematic cross-sectional view of an outer peripheral wall of a pillar shaped honeycomb structure, electrode connecting portions, and an electrode layer, which is parallel to an axial direction of the pillar shaped honeycomb structure, according to still another embodiment of the present invention.

FIG. 8 is a schematic cross-sectional view of the outer peripheral wall 12, the electrode connecting portions 39, and the electrode layer 14a, 14b of the pillar shaped honeycomb structure 10, which is parallel to the axial direction of the pillar shaped honeycomb structure 10, according to yet another embodiment of the present invention. Each electrode connecting portion 39 has a plurality of pillar shaped parts 37 (rising portions) provided so as to stand upright on the electrode layers 14a, 14b, and connecting part 38 that connects the upper ends of the plurality of pillar shaped parts 37. According to such a structure, a larger number of pillar shaped parts 37 can be disposed with a smaller number of electrode connecting portions 39, so that design flexibility can be increased while ensuring good connectivity to the metal connector 41.

Each pillar shaped part 37 can be formed in a circular pillar shape or a polygonal pillar shape. The connecting part 38 that connects the upper ends of the plurality of pillar shaped parts 37 may be integrally formed with the plurality of pillar shaped parts 37, or those separately formed may be connected by welding or the like. Further, the electrode connecting portions 39 as shown in FIG. 8 and the electrode connecting portions 30 as shown in FIGS. 3, 4 and 6 may be provided on the surfaces of the electrode layers 14a, 14b.

By supporting the catalyst on the electric heating type support 20, the electric heating type support 20 can be used as a catalyst. For example, a fluid such as an exhaust gas from a motor vehicle can flow through the flow paths of the plurality of cells 15. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a $NO_x$ storage reduction catalyst (LNT catalyst) containing an alkaline earth metal and platinum as storage components for nitrogen oxides ($NO_x$). Illustrative examples of a catalyst that does not use the noble metal include a $NO_x$ selective catalytic reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

<Method for Producing Electric Heating Type Support>

A method for producing the electric heating type support 20 according to the present invention will now be illustratively described. In an embodiment, the method for producing the electric heating type support 20 according to the present invention includes: a step A1 of obtaining an unfired pillar shaped honeycomb structure with an electrode layer forming paste; a step A2 of firing the unfired pillar shaped honeycomb structure with the electrode layer forming paste to form a pillar shaped honeycomb structure; and a step A3 of binding the electrode connecting portions to the pillar shaped honeycomb structure.

The step A1 is to prepare a pillar shaped honeycomb formed body that is a precursor of the pillar shaped honeycomb structure, and apply an electrode layer forming paste to a side surface of the pillar shaped honeycomb formed body to obtain an unfired pillar shaped honeycomb structure with the electrode layer forming paste. The preparation of the pillar shaped honeycomb formed body can be carried out in accordance with a method for preparing a pillar shaped honeycomb formed body in a known method for producing a pillar shaped honeycomb structure. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 µm, and more preferably from 3 to 40 µm. The average particle diameter of the metallic silicon (the metallic silicon powder) is preferably from 2 to 35 µm. The average particle diameter of each of the silicon carbide particles and the metallic silicon (metallic silicon particles) refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the pillar shaped honeycomb structure is the silicon-silicon carbide composite material. In the case where the material of the pillar shaped honeycomb structure is silicon carbide, no metallic silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10 parts by mass when the total mass of the silicon carbide powder and the metallic silicon powder is 100 parts by mass. An average particle diameter of the pore former is preferably from 10 to 30 µm. If the average particle diameter is less than 10 µm, pores may not be sufficiently formed. If the average particle diameter is more than 30 µm, a die may be clogged during forming. The average particle diameter of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a pillar shaped honeycomb structure. In extrusion molding, a die having a desired overall shape, cell shape, partition wall thickness, cell density and the like can be used. Preferably, the resulting pillar shaped honeycomb structure is then dried. When the length in the central axis direction of the pillar shaped honeycomb structure is not the desired length, both the end faces of the pillar shaped honeycomb structure can be cut to the desired length. The pillar shaped honeycomb structure after drying is referred to as a pillar shaped honeycomb dried body.

The electrode layer forming paste for forming electrode layers is then prepared. The electrode layer forming paste can be formed by appropriately adding and kneading various additives to raw material powder (metal powder, ceramic powder, and the like) formulated according to required characteristics of the electrode layers. When the electrode layers has a laminated structure, the joining strength between each electrode connecting portion and each electrode layer tends to be improved by increasing an average particle diameter of the metal powder in the paste for the second electrode layer, as compared with an average particle diameter of the metal powder in the paste for the first electrode layer. The average particle diameter of the metal powder refers to an arithmetic average diameter on volume basis when frequency distribution of the particle diameter is measured by the laser diffraction method.

The resulting electrode layer forming paste is applied to the side surface of the pillar shaped honeycomb formed body (typically, the pillar shaped honeycomb dried body) to obtain an unfired pillar shaped honeycomb structure with an electrode layer forming paste. The method for preparing the electrode layer forming paste and the method for applying the electrode layer forming paste to the pillar shaped honeycomb formed body can be performed according to a known method for producing a pillar shaped honeycomb structure. However, in order to achieve lower electrical resistivity of the electrode layer than the pillar shaped honeycomb structure, it is possible to increase a metal content ratio or to decrease the particle diameter of the metal particles as compared with that of the pillar shaped honeycomb structure.

As a variation of the method for producing the pillar shaped honeycomb structure, in the step A1, the pillar shaped honeycomb formed body may be temporarily fired before applying the electrode layer forming paste. That is, in this variation, the pillar shaped honeycomb formed body is fired to produce a pillar shaped honeycomb fired body, and the electrode layer forming paste is applied to the pillar shaped honeycomb fired body.

In the step A2, the unfired pillar shaped honeycomb structure with the electrode layer forming paste is fired to obtain a pillar shaped honeycomb structure. Prior to firing, the unfired pillar shaped honeycomb structure with the electrode layer forming paste may be dried. Also, prior to firing, degreasing may be carried out to remove the binder and the like. As the firing conditions, the unfired pillar shaped honeycomb structure is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

In the step A3, the electrode connecting portions in the form having at least one independent rising portion are welded to the surfaces of the electrode layers on the pillar shaped honeycomb structure. A preferable welding method may be laser welding, in terms of control of the welded area and production efficiency. The electric heating type support with the electrode connecting portions electrically connected to the electrode layers is thus obtained.

As shown in FIG. 6, when the lower ends of the electrode connecting portions are embedded in the outer peripheral wall of the pillar shaped honeycomb structure, pores each having a shape corresponding to the cross-sectional shape of the lower end of each electrode connecting portion and having a certain depth are firstly formed in the outer peripheral wall of the pillar shaped honeycomb structure. The lower ends of the electrode connecting portions are inserted into the pores together with a material for the intermediate layer and a heat treatment is carried out, whereby the lower ends of the electrode connecting portions can be embedded in and fixed to the outer peripheral wall of the pillar shaped honeycomb structure.

<Exhaust Gas Purifying Device>

Figure 9:
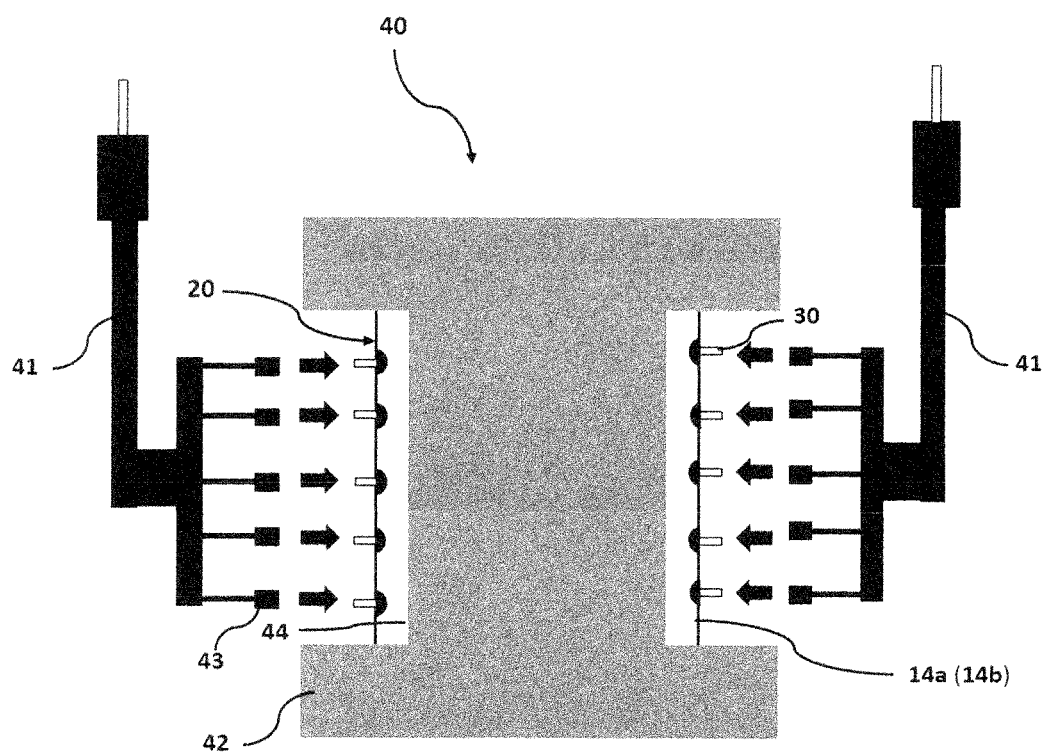
FIG. 9 is a schematic plan view of an exhaust gas purifying device according to an embodiment of the present invention.

Each of the electric heating type supports 20 according to the above embodiments of the present invention can be used for an exhaust gas purifying device as shown in FIG. 9. In the exhaust gas purifying device 40, the electric heating type support 20 can be installed in an exhaust gas flow path for allowing an exhaust gas from an engine to flow.

The exhaust gas purifying device 40 according to the embodiment of the present invention produced as described above includes: the electric heating type support 20; and the can body 42 fitted to the outer peripheral surface of the electric heating type support 20. The holding material (not shown) is provided between the outer peripheral surface of the electric heating type support 20 and the inner peripheral surface of the can body 42.

The exhaust gas purifying device 40 is produced by fitting the electric heating type support 20 into the substantially cylindrical can body 42 via the holding material composed of a flexible heat insulating member or the like by means of push-in canning. At this time, the height of the electric heating type support 20 from the surface of the electrode layer 14a, 14b of each electrode connecting portion 30 is controlled to be from 1 to 6 mm, so that the height of each electrode connecting portion 30 from the surface of the electrode layer 14a, 14b is less than or equal to the height of the gap between the can body 42 and each of the electrode layers 14a, 14b, which gap is generated when fitting the electric heating type support 20 to the can body 42. Therefore, when the electric heating type support 20 is fitted to the can body 42, it is possible to prevent the electrode connecting portions 30 from being brought into contact with the can body 42, by a simple means such as the push-in canning.

Openings 44 are provided on both side surfaces of the can body 42. The metal connectors 41 are introduced into the electrode connecting portions 30 of the electric heating type support 20 from the openings 44 of the can body 42 to electrically connect the electrode connecting portions 30 to the metal connectors 41. The metal connectors 41 can be connected to external power sources to apply a voltage to the electric heating type support 20. Each of the metal connectors 41 can be, for example, formed in a comb shape as shown in FIG. 9, although not particularly limited thereto. In the metal connectors 41, each tip 43 has a cylindrical shape, and the cylindrical electrode connecting portion 30 is fitted to the interior of that cylinder, so that the metal connector 41 and the electrode connecting portion 30 are electrically connected to each other. The exhaust gas purifying device 40 may have welding contact portions or thermal-spraying portions for joining the metal connectors 41 to the electrode connecting portions 30.

<Method of Producing Exhaust Gas Purifying Device>

Next, a method for producing the exhaust gas purification device 40 according to an embodiment of the present invention will be described in detail. First, a catalyst is supported on the electric heating type support 20 according to an embodiment of the present invention. The catalyst to be used can be the noble metal-based catalyst or a catalyst other than those. The electric heating type support 20 with the catalyst supported is then fitted to the can body 42 via the holding material composed of a flexible heat insulating member by means of push-in canning.

The metal connectors 41 are then introduced into the electrode connecting portions 30 of the electric heating type support 20 fitted to the interior of the can body 42 through the openings 44 provided on both side surfaces of the can body 42 to join the electrode connecting portions 30 and the metal connectors 41 to produce the exhaust gas purifying device 40.

A method of joining the electrode connecting portions 30 and the metal connectors 41 that can preferably be used include, but not particularly limited to, at least one selected from the group consisting of a molten metal method, a solid phase bonding method, and a mechanical joining method.

The molten metal method that can be used includes at least one method selected from the group consisting of brazing, liquid phase diffusion bonding, welding and eutectic bonding. The brazing and the liquid phase diffusion bonding are preferable. Examples of welding include laser welding, EB welding, TIG welding, MIG welding, plasma welding, resistance welding, and condenser welding. The laser welding, plasma welding, and resistance welding are more preferable, and the laser welding is still more preferable.

Examples of the solid phase bonding method include diffusion bonding, a sintering method, friction stirring welding, and ultrasonic bonding. The sintering method and the ultrasonic bonding are more preferable. When the sintering method is used, it is also preferable to use a sintered joining material in the sintering method as the intermediate layer 16.

Examples of the mechanical joining method include shrink fitting, press fitting, screwing, caulking, and a plastic joining method. The caulking and the plastic joining method are more preferable.

DESCRIPTION OF REFERENCE NUMERALS 10, 51 pillar shaped honeycomb structure
12 outer peripheral wall
13 partition wall
14a, 14b electrode layer
15 cell
16 intermediate layer
19 separation zone
20, 50 electric heating type support
30, 36, 39 electrode connecting portion
31 welded portion
32 rising portion
34, 37 pillar shaped part
35, 38 connecting part
40 exhaust gas purifying device
41 metal connector 42, 53 can body
43 tip
44, 54 opening
52 electrode

The invention claimed is:

1. An electric heating type support, comprising: a pillar shaped honeycomb structure being configured to a ceramic body, comprising: an outer peripheral wall; and partition walls disposed on an inner side of the outer peripheral wall, the partition walls defining a plurality of cells, each of the cells extending from one end face to other end face to form a flow path; at least one electrode layer disposed on a surface of the outer peripheral wall of the pillar shaped honeycomb structure; and at least one electrode connecting portion attached to the at least one electrode layer such that the at least one electrode connecting portion extends through an entire thickness of the at least one electrode layer and a lower end of the at least one electrode connecting portion is embedded in the outer peripheral wall of the pillar shaped honeycomb structure and protrudes into the ceramic body of the pillar shaped honeycomb structure, with the at least one electrode connecting portion being connectable to a metal connector, wherein the at least one electrode connecting portion has at least one independent rising portion, and a height of the at least one electrode connecting portion from a surface of the at least one electrode layer is from 1 to 6 mm, wherein the at least one electrode connecting portion is a pillar shaped electrode connecting portion provided so as to stand upright on the at least one electrode layer.

2. The electric heating type support according to claim 1, wherein at least a surface of the at least one electrode connecting portion is configured to a metal.

3. The electric heating type support according to claim 2, wherein the at least one electrode connecting portion is entirely configured to a metal.

4. The electric heating type support according to claim 1, wherein the at least one electrode connecting portion has a circular pillar shape or a polygonal pillar shape.

5. The electric heating type support according to claim 4, wherein the at least one electrode connecting portion has a circular pillar shape having an outer diameter of from 1 to 20 mm.

6. The electric heating type support according to claim 1, wherein the at least one electrode connecting portion comprises:
a plurality of pillar shaped parts provided so as to stand upright on the at least one electrode layer; and
a connecting part(s) for connecting lower ends of the plurality of pillar shaped parts to each other.

7. The electric heating type support according to claim 1, wherein the at least one electrode connecting portion comprises:
a plurality of pillar shaped parts provided so as to stand upright on the at least one electrode layer; and
a connecting part(s) for connecting upper ends of the plurality of pillar shaped parts to each other.

8. The electric heating type support according to claim 1, wherein at least one intermediate layer is provided between the at least one electrode layer and the at least one electrode connecting portion.

9. The electric heating type support according to claim 8, wherein the intermediate layer is configured to an oxide ceramic or a mixture of a metal or a metal compound and an oxide ceramic.

10. The electric heating type support according to claim 1, wherein the at least one electrode layer is a pair of electrode layers arranged on a surface of the outer peripheral wall of the pillar shaped honeycomb structure so as to face each other across a central axis of the pillar shaped honeycomb structure, and wherein electrode connecting portions are formed on the pair of electrode layers.

11. An exhaust gas purifying device, comprising:
the electric heating type support according to claim 1;
a can body that is fitted to an outer peripheral surface of the electric heating type support; and
a metal connector electrically connected to the at least one electrode connecting portion.

12. The exhaust gas purifying device according to claim 11, further comprising a welding contact portion or a thermal spraying portion for joining the metal connector to the at least one electrode connecting portion.

13. A method for producing the exhaust gas purifying device according to claim 11, the method comprising the following steps, in order:
fitting the electric heating type support to the can body; and
electrically connecting the metal connector to the at least one electrode connecting portion.

14. The method according to claim 13, wherein fitting the electrically heating type support to the can body is push-in canning.

15. The method according to claim 13, wherein electrically connecting the metal connector to the at least one electrode connecting portion is at least one selected from the group consisting of a molten metal method, a solid phase bonding method, and a mechanical joining method.

16. The method according to claim 15, wherein the molten metal method is at least one selected from the group consisting of welding, brazing, liquid phase diffusion bonding, and eutectic bonding.

17. The method according to claim 16, wherein the welding is at least one selected from the group consisting of laser welding, EB welding, TIG welding, MIG welding, plasma welding, resistance welding, and condenser welding.

18. The method according to claim 15, wherein the solid phase bonding method is at least one selected from the group consisting of diffusion bonding, sintering method, friction stirring welding, and ultrasonic joining.

19. The method according to claim 15, wherein the mechanical joining method is at least one selected from the group consisting of shrink fitting, press fitting, screwing, and a plastic joining method.

20. The method according to claim 13, further comprising a step of supporting a catalyst on the electric heating type support prior to the step of fitting the electric heating type support to the can body.

21. The electric heating type support according to claim 1, having three or more of the electrode connecting portions.

22. An electric heating type support fittable to a can body, the electric heating type support comprising: a pillar shaped honeycomb structure being configured to a ceramic body, comprising: an outer peripheral wall; and partition walls disposed on an inner side of the outer peripheral wall, the partition walls defining a plurality of cells, each of the cells extending from one end face to other end face to form a flow path; at least one electrode layer disposed on a surface of the outer peripheral wall of the pillar shaped honeycomb structure; and at least one electrode connecting portion attached to the at least one electrode layer such that the at least one electrode connecting portion extends through an entire thickness of the at least one electrode layer and a lower end of the at least one electrode connecting portion is embedded in the outer peripheral wall of the pillar shaped honeycomb structure and protrudes into the ceramic body of the pillar shaped honeycomb structure, with the at least one electrode connecting portion being connectable to a metal connector, wherein the at least one electrode connecting portion has at least one independent rising portion, and a height of the at least one electrode connecting portion from a surface of the at least one electrode layer is less than or equal to a height of a gap between the can body and the at least one electrode layer, the gap being generated when the electric heating type support is fitted to the can body, wherein the at least one electrode connecting portion is a pillar shaped electrode connecting portion provided so as to stand upright on the at least one electrode layer.

23. The electric heating type support according to claim 22, having three or more of the electrode connecting portions.

24. An electric heating type support, comprising: a pillar shaped honeycomb structure being configured to a ceramic body, comprising: an outer peripheral wall; and partition walls disposed on an inner side of the outer peripheral wall, the partition walls defining a plurality of cells, each of the cells extending from one end face to other end face to form a flow path; at least one electrode layer disposed on a surface of the outer peripheral wall of the pillar shaped honeycomb structure; and at least one electrode connecting portion attached to the at least one electrode layer such that the at least one electrode connecting portion extends through an entire thickness of the at least one electrode layer and a lower end of the at least one electrode connecting portion is embedded in the outer peripheral wall of the pillar shaped honeycomb structure and protrudes into the ceramic body of the pillar shaped honeycomb structure, with the at least one electrode connecting portion being connectable to a metal connector, wherein the at least one electrode connecting portion has at least one independent rising portion, and a height of the at least one electrode connecting portion from a surface of the at least one electrode layer is from 1 to 6 mm, wherein the at least one electrode connecting portion comprises: a plurality of pillar shaped parts provided so as to stand upright on the at least one electrode layer; and a connecting part(s) for connecting lower ends or upper ends of the plurality of pillar shaped parts to each other.

* * * * *